Oct. 25, 1927.

F. J. SMITH 1,646,984

HOG SCALDING APPARATUS

Filed April 29, 1926

Inventor
Frank J. Smith

By
Attorney

Oct. 25, 1927.
F. J. SMITH
1,646,984
HOG SCALDING APPARATUS
Filed April 29, 1926    2 Sheets-Sheet 2
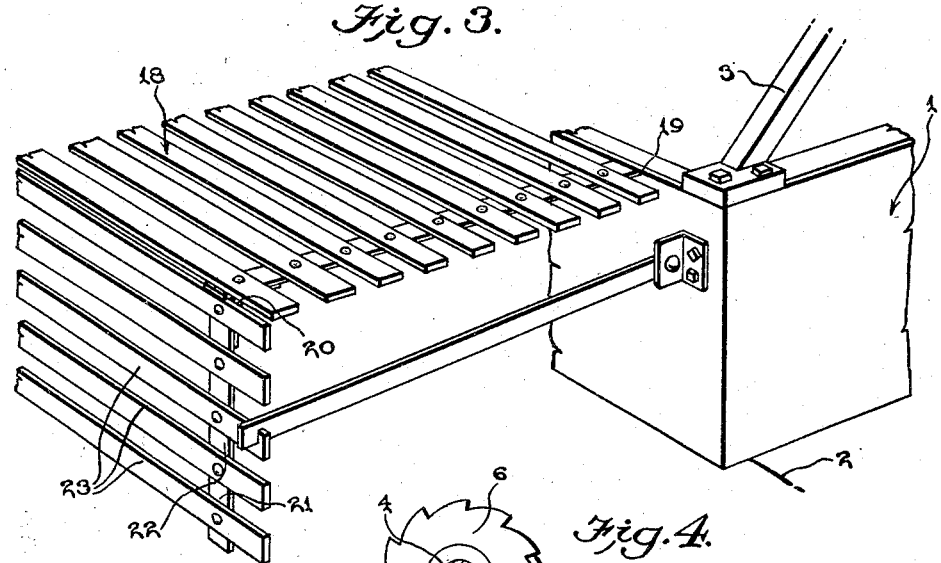
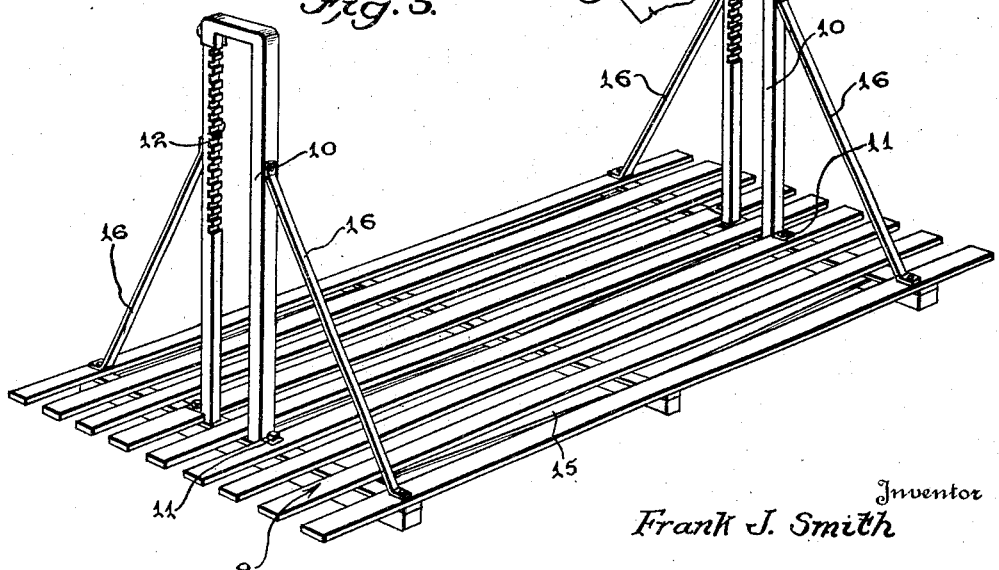
Inventor
Frank J. Smith
By
Attorney Patented Oct. 25, 1927.

1,646,984

UNITED STATES PATENT OFFICE.

FRANK J. SMITH, OF DODGE CITY, KANSAS.

HOG-SCALDING APPARATUS.

Application filed April 29, 1926. Serial No. 105,457.

It is a purpose of the present invention to provide, in a hog scalding apparatus of the character set forth in the patent of June 23, 1925, No. 1,543,129, to Frank J. Smith, an improved hoisting and lowering bottom for use in the tank in lieu of the sling employed in connection with the apparatus disclosed in the patent.

In carrying out this substitution, it is the aim to simplify the structure of the apparatus as well as the operation of lowering and hoisting the hog into the tank, also in eliminating the necessity of extracting the sling from around and under the hog after it has been scalded, it having been found that it is tedious to remove the sling from around the hog while the carcass is in a heated condition, that is, after removal from the tank.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 3 is a fragmentary perspective view of one corner of the tank showing the slide or table as having been disposed in horizontal position and upon which the carcass may be butchered after scalding.

Figure 4 is an enlarged detail view of the ratchet mechanism for holding the shaft of a windlass in a position to support the hoisting and lowering bottom in a raised position.

Figure 5 is a detail perspective view of the hoisting and lowering bottom.

Figures 1, 2:
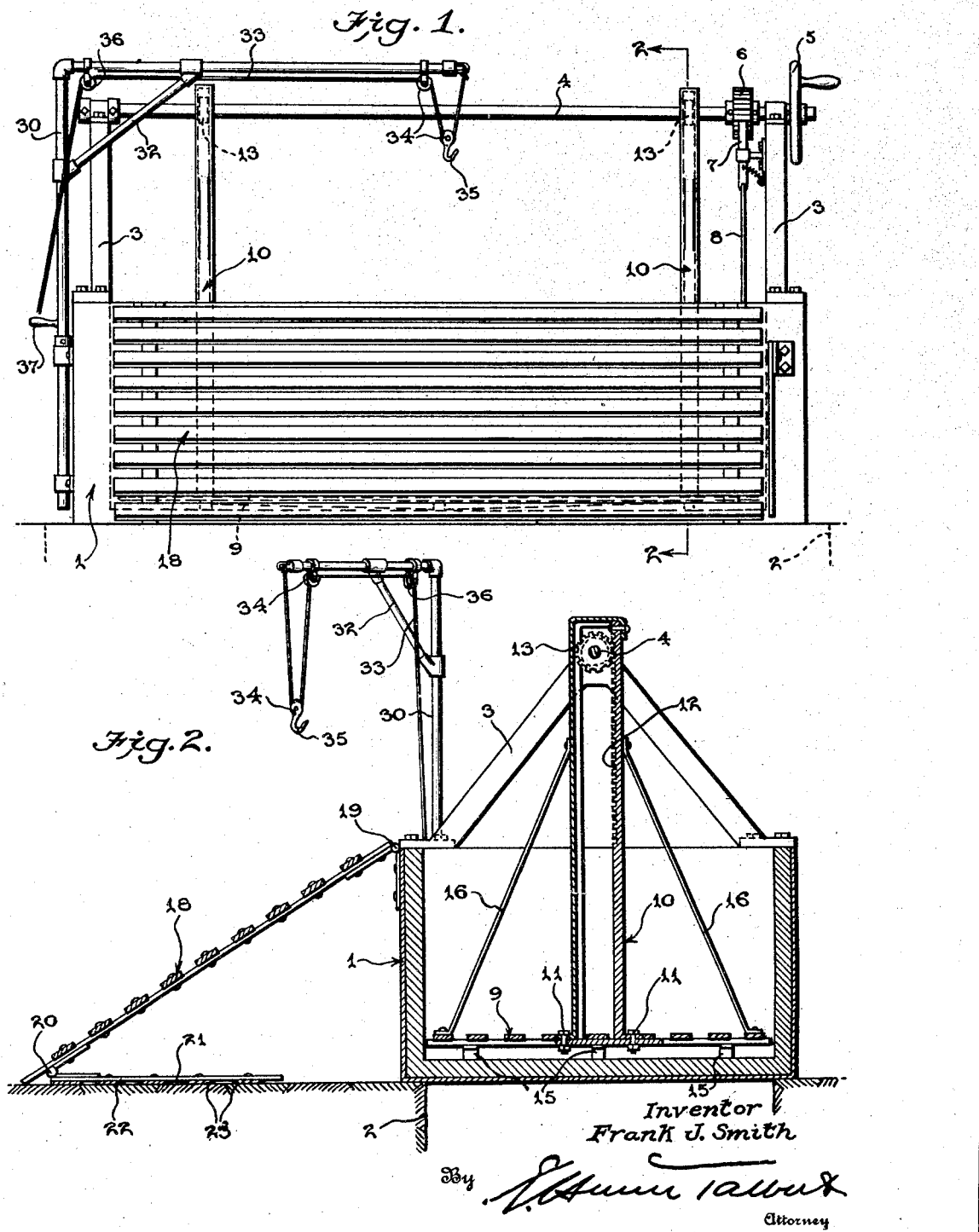
Figure 1 is a view in side elevation of the improved apparatus constructed in accordance with the invention, showing a hoisting means in the act of pulling a carcass up a slide in order that the carcass may be hoisted over and upon a hoisting and lowering bottom.
Figure 2 is a sectional view on line 2—2 of Figure 1, showing the hoisting means in the act of lifting the carcass from the highest point of the slide, so that the hoisting apparatus may be turned to swing the carcass to a position over the hoisting and lowering bottom.

Referring to the drawings, 1 designates a tank which may be any suitable shape, preferably rectangular, and of any suitable construction, preferably with a wooden interior with a metal exterior. In using the hog scalding apparatus, a suitable trench of proper size is excavated in the ground and over the trench 2 the tank may be supported. A fire may be built in the trench, there being sufficient room at each end of the tank to permit the escape of smoke. The water in the tank is heated by the fire to the boiling point for the purpose of scalding hogs to be lowered into the tank one by one.

Rising from the ends of the tank are standards 3, in bearings of the upper ends of which a windlass shaft 4 is mounted. One end of the shaft 4 is supplied with a hand wheel 5, whereby the shaft may be rotated. Also carried by the shaft is a ratchet 6, there being a spring tensioned pawl 7 mounted upon one of the standards for cooperation with the ratchet wheel for the purpose of holding the shaft in different adjusted revoluble positions. A rod or cable 8 is attached to one end of the spring tensioned pawl for the purpose of disengaging the pawl from the ratchet in order to release the shaft and allow a hoisting and lowering bottom to descend into the tank of scalding water.

The hoisting and lowering bottom 9 has uprights 10 at its opposite ends. In other words, the uprights are U-shaped and the legs thereof are secured at 11 to the hoisting bottom. One of the legs of each U-shaped upright is provided with rack teeth 12 which mesh with the teeth of the gears 13 which are fixed on the windlass shaft 4. It will be noted that by rotating the hand wheel 5, in turn imparting revoluble movement to the windlass shaft 4, the rack uprights are hoisted, together with the hoisting and lowering bottom, until the bottom is flush or level with the upper edges of the tank. When the hog is placed upon the hoisting bottom while it is in a raised position, the rod or cable 8 may be operated to release the pawl, and by first grasping the handle of the hand wheel 5, reverse movement of the windlass shaft 4 is permitted, allowing the hoisting bottom to descend, conveying the carcass with it to the bottom of the tank and into the scalding water.

A slide 18, which also constitutes a table, is hingedly connected at 19 to one of the longitudinal sides of the tank. This slide or table comprises longitudinal and transverse slats, the transverse slats acting as braces for the longitudinal slats. Hingedly connected to the slide or table, as at 20, is a support 21 which comprises legs 22 and transverse bars 23. When the support is disposed perpendicularly to hold the table in a horizontal position, the upper ends of the legs obviously abut the under surfaces of the transverse bars of the table in order to insure preventing the support collapsing outwardly. When the table is used as a slide, the support may be collapsed under the table in the direction of the tank. When the support is so folded and the table allowed to be tilted on an inclination from the side of the tank, the outer edge of the table will rest upon the ground. The carcass of a hog may be placed at the lower edge of the slide while it is in an inclined position, after which it may be drawn up the slide and then swung over in a position to be lowered upon the hoisting and lowering bottom.

A second hoisting device is provided and it comprises a rotating or rocking rod 30 mounted in bearings on one end of the tank adjacent one corner thereof and is provided with a lateral arm or rod 31 which is reinforced by a brace rod 32. A suitable hoisting cable 33 is connected to one end of the arm and cooperates with pulleys 34, whereby one pulley (which carries a hook 35) may be raised and lowered for the purpose of hoisting and lowering the hog. The cable 33 passes over another pulley 36 and has its other end portion in a convenient position near a handle 37 which is carried by the rod 30, which handle is used for rocking the rod for the purpose of swinging the arm over the center of the tank or trough, or over the center of the table.

The cable 33 is long enough to allow the hook 35 with its pulley 34 to be extended to a position close to the carcass of the hog when at the lower edge of the slide or table 18, that is, while such table is inclined. It is then possible to pull upon the cable 33, that is, after connecting the hook 35 to the carcass, and thereby pull the carcass up the slide adjacent the upper longitudinal edge of the table, and then by rocking the rod 30, and at the same time pulling upon the cable 33, the hog is hoisted to a position over the center of the hoisting and lowering bottom in the tank. After the carcass of the hog has been so positioned, by manipulation of this second hoist, the cable 33 may be allowed to feed out and allow the carcass to be lowered upon the hoisting and lowering bottom. The hook 35 can then be detached, and then by releasing the pawl 7 through the medium of the rod or cable 8, the lowering and hoisting bottom may be allowed to descend into the tank with the carcass thereon, consequently scalding the carcass.

After thoroughly scalding the hog, the hand wheel 5 may be operated and the hoisting and lowering bottom raised through the medium of the rack uprights and then by inserting the hook 35 into the carcass and subsequently swinging the arm or rod 31, the carcass may be swung to the center of the table 18, that is, when the support 21 has been disposed in a vertical position. When the carcass is so disposed upon the table, it may be easily butchered according to conventional methods.

The hoisting and lowering bottom has its under portion braced or reinforced by the bars 15, said bottom also including the side bracing slats 16 which prevent the carcass of the hog from rolling too far when the bottom is in a hoisted position.

The invention having been set forth, what is claimed is:

1. A device for the purpose indicated including a movable bottom, a rotatable shaft disposed a substantial distance above the bottom and paralleling the same, spaced gears carried by the shaft, and U-shaped uprights upstanding from the bottom, said gears being straddled by said uprights and the latter on one leg on the inner face having rack teeth meshing with the teeth of said gear, and means for rotating said shaft.

2. A device for the purpose indicated including a movable bottom, a rotatable shaft disposed a substantial distance above the bottom and paralleling the same, spaced gears carried by the shaft, and U-shaped uprights upstanding from the bottom, said gears being straddled by said uprights and the latter on one leg on the inner face having rack teeth meshing with the teeth of said gear, a hand wheel carried at one extremity of the shaft for the manual operation of the same, a ratchet wheel mounted on the shaft, and a spring actuated pawl normally impelled towards the ratchet wheel and provided with an actuating means for its forcible disengagement from said ratchet wheel.

In testimony whereof he affixes his signature.

FRANK J. SMITH